Sept. 20, 1966 J. M. HANNAN 3,273,876
ADJUSTABLE SHOCK ABSORBER AND AUTOMATIC
CONTROL MECHANISM THEREFOR
Original Filed Aug. 31, 1964 2 Sheets-Sheet 1
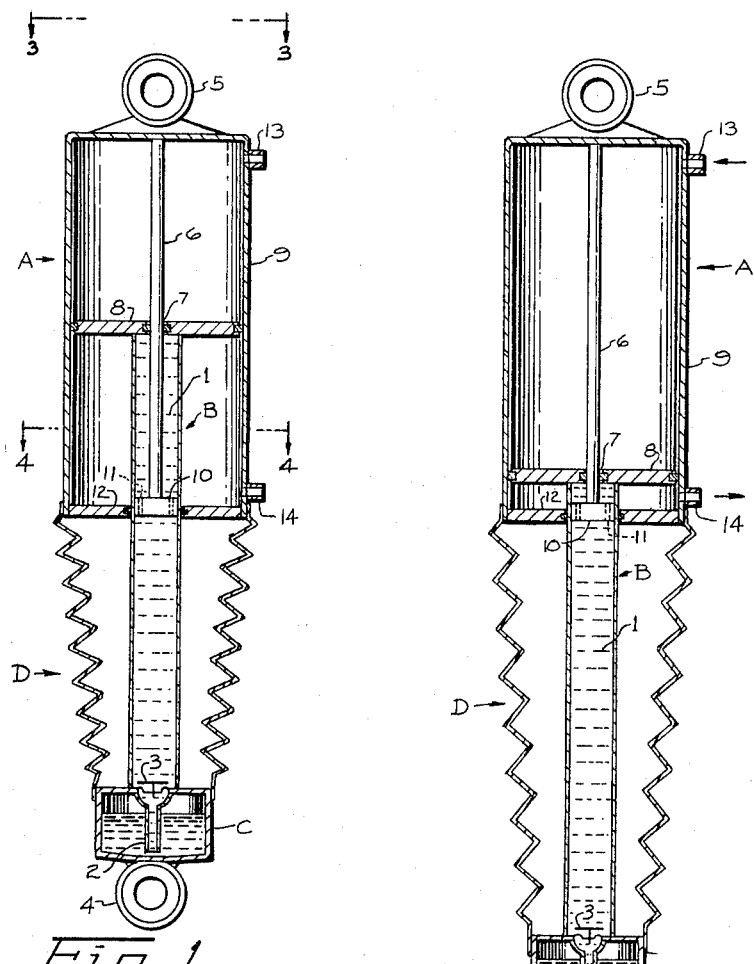
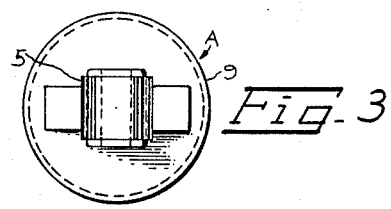
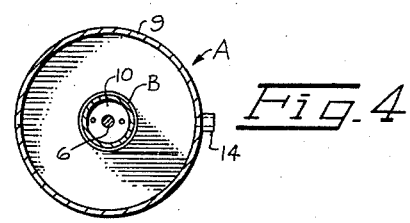
INVENTOR.
JERRY M. HANNAN
BY
William R. Piper
ATTORNEY INVENTOR.
JERRY M. HANNAN
BY
William R. Piper
ATTORNEY

United States Patent Office 3,273,876
Patented Sept. 20, 1966

3,273,876
ADJUSTABLE SHOCK ABSORBER AND AUTOMATIC CONTROL MECHANISM THEREFOR
Jerry M. Hannan, San Rafael, Calif.
Continuation of application Ser. No. 393,024, Aug. 31, 1964. This application July 1, 1965, Ser. No. 471,786
18 Claims. (Cl. 267—11)

This application is a continuing application of my application on an adjustable shock absorber and automatic control mechanism therefore, filed August 31, 1964, Serial No. 393,024.

The present invention relates to improvements in an adjustable shock absorber and automatic control mechanism therefor, and it consists in the combination, construction and arrangement of parts as hereinafter described and claimed.

The standard hydraulic shock absorbers are designed to smooth out the vertical vibrations of a vehicle as the vehicle wheels travel over rough roads. No provision has been made for causing the shock absorbers to incline the vehicle body in a transverse direction as the moving vehicle makes a turn in the road either to the right or to the left, the vehicle body thus being automatically banked in the right direction and at the proper angle during the actual turning movement.

An object of my invention is to provide a conventional hydraulic shock absorber and add a two-way air cylinder to it for increasing or decreasing the effective length of the shock absorber. I then mount two or four of these improved shock absorbers on a vehicle and make use of an automatic control mechanism that will elongate the shock absorbers on one side of the vehicle and shorten those on the other side as the vehicle makes turn in the road so that the vehicle body will be banked laterally in the right direction for the curve and at the proper angle. It is well known that if the vehicle body is not banked when the vehicle is making a turn, the tendency of the persons in the vehicle is to move laterally due to centrifugal force. If the vehicle body is properly and automatically banked when the vehicle is making a turn, then the center of gravity of both the vehicle body and the passengers in the vehicle will be shifted so there will be no tendency for a lateral movement.

A further object of my invention is to provide a device of the type described in which the automatic control mechanism can be adjusted so as to be sensitive to slight turns in the road and to bank the vehicle body properly to take care of these. Adjustment can be made to make the automatic control mechanism less sensitive so that a higher speed of the vehicle on a turn will have to be made before the mechanism becomes operative. In all cases, however, the hydraulic portion of the shock absorbers will operate just the same as the standard hydraulic shock absorber.

I further provide an automatic pressure regulator for the control mechanism that will operate at higher vehicle speeds when the vehicle makes a turn. The banking of the vehicle body will be more pronounced at these higher speeds so that the passengers will have no tendency to move laterally in the vehicle body due to centrifugal force.

The automatic control mechanism can be turned on or off. When it is not operating, the hydraulic shock absorbers will function in their usual manner. The invention is fairly simple in construction and can be packaged in kit form and then applied to any engine propelled vehicle.

Other objects and advantages will appear as the specification continues. The novel features of the invention will be set forth in the appended claims.

*Drawings*

For a better understanding of my invention, reference should be made to the accompanying drawings, forming part of this specification, in which:

FIGURE 1 is a vertical section through a hydraulic shock absorber and shows my air cylinder operatively applied thereto.

FIGURE 2 is a vertical section similar to FIGURE 1 but shows the air cylinder elongating the overall length of the shock absorber.

FIGURE 3 is a top plan view of FIGURE 1 when looking in the direction of the arrows 3—3 in FIGURE 1.

FIGURE 4 is a transverse section through the shock absorber and is taken along the line 4—4 of FIGURE 1.

Figure 5:
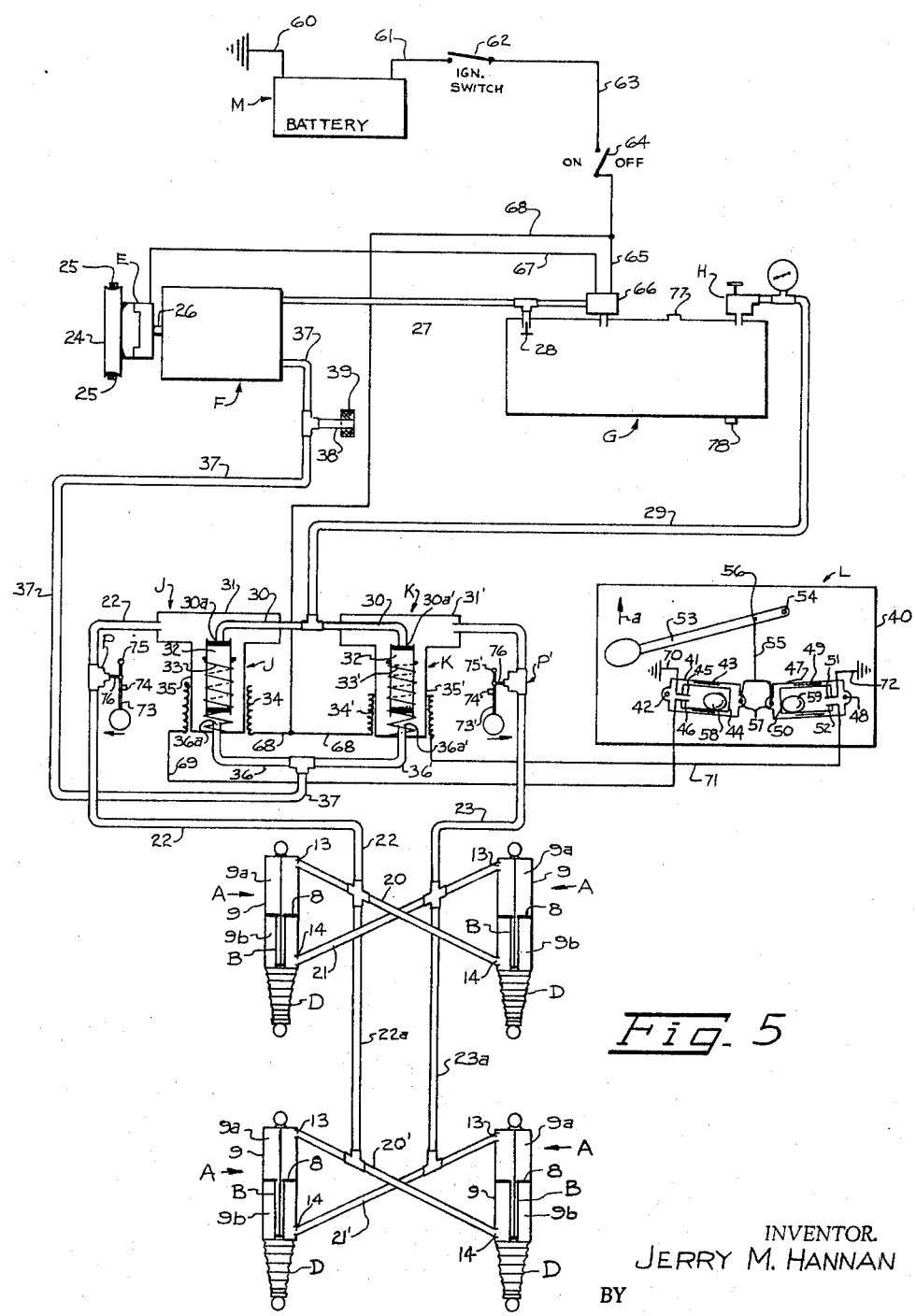
FIGURE 5 is a diagrammatic view of the automatic control mechanism and associate parts for elongating or shortening the effective lengths of the shock absorbers.

While I have shown only the preferred form of my invention, it should be understood that various changes, or modifications, may be made within the scope of the annexed claims without departing from the spirit thereof.

*Detailed description*

In carrying out my invention I will first describe the construction of my improved shock absorber and then will set forth how four of these shock absorbers when applied to a vehicle will greatly reduce the sidewise swaying motion of the vehicle when rounding a curve in the road. The shock absorber is shown in FIGURES 1 to 4 inclusive.

In FIGURE 1, I show the shock absorber A as comprising a central cylinder B that is filled with a fluid 1. At the lower end of the cylinder B, I provide a reservoir C for receiving any excess fluid from the cylinder B. A pipe 2 communicates with the bottom of the cylinder B and a check valve 3 controls the flow of fluid from the cylinder B, through the pipe 2 and into the reservoir C.

A bottom ring 4 depends from the bottom of the reservoir wall C and this ring may be attached to a moving part in an automobile such as the axle to a wheel. A top ring 5 may be attached to a fixed part of the automobile frame and a piston rod 6 depends from the top ring and is slidably received in an opening 7 in the top of the cylinder B. The top of the cylinder B is in the form of a piston 8 and this piston is slidably received in an air cylinder 9. The periphery of the piston 8 has a Teflon seal that slidably contacts with the inner surface of the cylinder 9 and prevents any leakage of air past the piston. In like manner the opening 7 in the center of the piston 8 also has a Teflon seal that prevents leakage of the liquid 1 from the interior of the cylinder B into the portion of the air cylinder 9 that is disposed above the piston 8.

The lower end of the piston rod 6 has a piston 10 mounted thereon and this piston slidably contacts with the inner surface of the cylinder B. The piston 10 has bleed passages 11 for permitting the liquid to slowly move through these passages when the piston is moved into the cylinder B due to the moving of the bottom ring 4 toward the top ring 5 or when the piston moves toward the top of the cylinder B when the ring 4 moves away from the ring 5. It will be noted that as the piston 10 moves downwardly in the cylinder B, the piston rod 6 will enter the portion of the cylinder B disposed above the piston and therefore this portion of the cylinder will receive less liquid then if no piston rod were received in the cylinder. The cylinder B is filled with liquid and therefore the excess liquid due to the piston rod 6 entering the cylinder must be received in the reservoir C. When the piston 10 starts on its up stroke the liquid in the cylinder B disposed above the piston 10 will be forced through the bleed passages 11 to slow down the movement of the piston and if there is insufficient liquid to fill the lower part of the cylinder B, then the piston 10 will create sufficient vacuum in the lower part of the cylinder to draw liquid from the reservoir C back through the pipe 2, past the check valve 3 and into the cylinder B. In this way the cylinder B is kept entirely filled with liquid at all times regardless of the position of the piston 10 in the cylinder.

The bottom of the air cylinder 9 is closed by a disc 12 and this disc slidably receives the cylinder B. A Teflon seal is provided between the central opening in the disc 12 and the outer surface of the cylinder B so that there will be no leakage of air from the lower portion of the cylinder 9 and through the opening in the disc 12. A conical shaped bellows D has its upper end secured to the lower end of the cylinder 9 and has its lower end secured to the top of the wall of the reservoir C. The bellows will prevent dirt and the like from contacting with the outer surface of the cylinder B that projects below the disc 12. The cylinder 9 has an opening 13 in its top for permitting air to enter the upper portion of the cylinder or to exhaust therefrom. Also the lower end of the cylinder 9 has another air opening 14 for permitting air to enter the lower portion of the cylinder 9 that is disposed below the piston 8 or to flow from the cylinder.

The shock absorber A with the cylinder B and the piston 10 with its piston rod 6 will operate in the same manner as a standard hydraulic shock absorber when the rings 4 and 5 are moved toward each other or away from each other and the only difference is that the reservoir C is provided at the bottom of the cylinder B. The purpose of the air cylinder 9 is to increase or decrease the effective length between the rings 4 and 5 when the vehicle moves around a curve in the road. The purpose of this will be made clear in the description of the operation of the entire device. In addition the air in the cylinder 9 will act as an additional buoyant support cooperating with the shock absorber and there will be more resiliency provided between the rings 4 and 5 than can otherwise be provided when only the liquid 1 is used in the cylinder B for retarding the movement of the piston 10 in either direction. FIGURE 1 shows the shock absorber in normal position while FIGURE 2 shows the shock absorber in an elongated position.

I will now describe the control mechanism for the shock absorber when they are used on a vehicle. The control mechanism will automatically feed air under pressure to the two shock absorbers disposed on the side of the vehicle that are further removed from the center of a curve that the vehicle is taking when it moves around the curve in a road. This air will increase the effective lengths of these shock absorbers. At the same time the control mechanism will force air into the other two shock absorbers disposed on the opposite side of the vehicle for decreasing the effective lengths of these shock absorbers. The result will be the tendency for the shock absorbers to tilt the body of the vehicle laterally so as to bank it and cause the side of the vehicle disposed further from the center of the curve to be raised and the outer side of the vehicle to be lowered. This will do much to increase the enjoyment of travel of persons riding in the vehicle because the correct banking of the vehicle body as it rounds a curve will change the center of gravity of the person or persons riding in the vehicle and make them negotiate the curve more easily.

*Control apparatus for altering the effective lengths of the shock absorbers*

The control apparatus is shown in FIGURE 5, and I show the four shock absorbers A diagrammatically. The left front shock absorber is connected to the right front shock absorber of the vehicle by an air conduit 20. This conduit connects the upper compartment 9a of the left front shock absorber to the lower compartment 9b of the right front shock absorber. The conduit 20 is actually connected to the opening 13 in the left front shock absorber and to the opening 14 in the right front shock absorber. The four shock absorbers A are shown diagrammatically in FIGURE 5 and are labelled LEFT FRONT, RIGHT FRONT, and LEFT REAR and RIGHT REAR.

Another air conduit 21 has one end connected to the bottom opening 14 of the cylinder 9 in the left front shock absorber and the other end of the conduit is connected to the top opening 14 of the cylinder 9 in the left front shock absorber and the other end of the conduit is connected to the top opening 13 of the cylinder 9 in the right front shock absorber. This means that when air for example is caused to flow into the upper compartment 9a of the left front shock absorber, then the piston 8 will be moved downwardly in the cylinder 9 and will decrease the size of the lower compartment 9b in the cylinder 9 and cause air in this cylinder to be expelled through the conduit 21. I will explain hereinafter where the expelled air from the lower compartment 9b in the left front shock absorber will escape to the atmosphere. The effect of the enlargement of the compartment 9a in the left front shock absorber will be to elongate the effective length between the bottom ring 4 and the top ring 5 of this shock absorber and the purpose of this elongation will be explained hereinafter. At the same time that air is entering the upper compartment 9a in the left front shock absorber from an air feed line 22, air from the same feed line will flow through the air conduit 20 and enter the lower compartment 9b of the air cylinder 9 in the right front shock absorber. This air will move the piston 8 upwardly in the cylinder and thus move the ring 4 toward the ring 5 to shorten the effective length of this shock absorber. The air in the upper compartment 9a of the right front shock absorber will escape through the opening 13 and flow into the air conduit 21 where it will escape to the atmosphere in a manner hereinafter described.

The left rear shock absorber A shown in FIGURE 5, is connected to the right rear shock absorber in precisely the same manner as the left front shock absorber is connected to the right front shock absorber. The air feed line 22 that communicates with the air conduit 20 that interconnects with the left front and right front shock absorbers has an extension 22a that communicates with an air conduit 20' that interconnects with the left rear shock absorber and with the right rear shock absorber. The air conduit 20' communicates with the compartment 9a of the air cylinder in the left rear shock absorber and the other end of the air conduit 20' communicates with the lower compartment 9b in the air cylinder 9 of the right rear shock absorber. It will further be seen that an air coundit 21' interconnects the lower compartment 9b of the air cylinder 9 of the left rear shock absorber with the upper compartment 9a of the cylinder 9 in the right rear shock absorber.

It is best now to describe how air under a desired pressure is fed to the air feed line 22 and extension 22a or can be fed to a second air feed line 23 and extension 23a. The air feed line 23 communicates with the air conduit 21 while the extension 23a communicates with the air conduit 21'. Both of the air feed lines 22 and 23 and their extensions 22a and 23a can function as exhaust air lines for conveying away the air from the compartments in the shock absorbers that are being reduced in capacity. This will be explained during the operation of the device.

In FIGURE 5, I diagrammatically show the control mechanism for feeding air under pressure to the air feed line 22 or to the air feed line 23. The control mechanism will automatically place the air line 23 in communication with the atmosphere when air is fed under pressure through the air line 22. Also the control mechanism will automatically place the air line 22 in communication with the atmosphere when air under pressure is fed to the air feed line 23.

A pulley 24 is connected to the crank shaft, not shown, of an engine, not shown, by an endless belt 25 so that as soon as the engine operates, the pulley 24 will be rotated. An electric clutch is indicated diagrammatically at E and this clutch is placed adjacent to the pulley 24 and will automatically connect the pulley to a compressor shaft 26 when an electric circuit is closed to the electric clutch in a manner hereinafter described.

The compressor shaft 26 operates an air compressor indicated diagrammatically at F. An air line 27 leads from the compressor F to an air pressure reserve tank G. A check valve indicated generally at 28 will permit air to enter the air pressure reserve tank G but will prevent any back flow of air from the tank G to the compressor F. An adjustable air pressure regulator indicated diagrammatically at H communicates with the air pressure reserve tank G and has an air line 29 leading from it to a pair of electrically operated three-way open exhaust air control valves J and K.

The air control valves J and K are identical to each other and therefore a description of the valve J will suffice for both valves and similar parts will be given like reference numerals except that the parts in the valve K will be primed. The air pipe 29 leads to a common pipe 30 that in turn has its ends extending into two headers 31 and 31' of the air valve J and K respectively. The outlet end 30a of the common air pipe 30 is normally closed by a spring biased armature 32. The armature 32 is yieldingly held in its raised position by a coil spring 33 and therefore air under pressure from the pipe 29 and common pipe 30 will be prevented from flowing into the housing of the air valve J by the armature 32 so long as the armature remains in its raised or closed position.

The air valve J has an electric wire coil 34 that surrounds a tubular portion 35 of the housing for the air valve J and the same tubular portion of the housing receives the armature 32. When the coil 34 is energized by an electric circuit hereinafter described, it will create a magnetic field that will attract the armature 32 downwardly for opening the end 30a of the common pipe and permit air under pressure to enter the header 31 of the air valve J. This same downward movement of the armature 32 will close the inlet end of an air exhaust pipe 36. FIGURE 5 shows the end 36a of the exhaust pipe 36 normally uncovered by the spring-biased armature 32 when the coil 34 is not energized and the spring 33 holds the armature 32 in its uppermost position for closing the outlet end 30a of the pipe 30.

The air exhaust pipe 36 communicates with an exhaust pipe 37 and the latter pipe leads back to the air compressor F. A branch pipe 38 communicates with the exhaust pipe 37 and leads to a combination screened exhaust member 39 that also acts as an air intake having an oiled filter.

In FIGURE 5, I show an adjustable control unit indicated generally at L and this unit is preferably placed on the dashboard of an automobile to which my shock absorbers are applied. The adjustale control unit comprises a base 40 and this base has a bracket 41 that is pivotally mounted on the base at 42. A spring clamp 43 is mounted on the bracket 41 and in turn the spring clamp grips a mercury switch indicated generally at 44. Two electrodes 45 and 46 extend into the left hand end of the mercury switch 44.

It will also be noted from FIGURE 5 that the base 40 carries a second bracket 47 and this is pivotally mounted on the base at 48. A spring clamp 49 is mounted on the bracket 47 and in turn carries a second mercury switch 50. The switch has two electrodes 51 and 52 that are adapted to be electrically connected in a manner presently to be described.

It will be seen from FIGURE 5 that the two brackets 41 and 47 are inclined downwardly at a slight angle from the horizontal. It is possible to change this angle by means of adjusting a lever 53 that has a frictional pivot connection at 54 to the base 40. A link 55 is pivoted to the lever 53 at 56 and the lower end of the link 55 is formed into two parallel and spaced apart arms that are pivotally connected at 57 to the inner ends of the brackets 41 and 47. It is possible to swing the lever 53 in the direction of the arrow a in FIGURE 5 so as to bring the two brackets 41 and 47 into more of a horizontal position. This movement will make the two mercury switches 44 and 50 more sensitive to close when subjected to centrifugal force in that when the vehicle to which the base 40 is attached is making a right hand turn, the centrifugal force will act on the ball of mercury 58 and cause it to move to the left in the mercury switch 44 for electrically connecting the electrodes 45 and 46. On the other hand should the vehicle make a left hand turn then the ball of mercury 59 in the mercury switch 50 will move to the right due to centrifugal force and will electrically connect the electrodes 51 and 52 together.

If the lever 53 is swung downwardly so as to cause the line 55 to be lowered and the inner ends of the brackets 41 and 47 also to be lowered, then the axes of the mercury switches 44 and 50 will be inclined at a greater angle to the horizontal and it will require a greater amount of centrifugal force to move the ball of mercury 58 upwardly in the inclined tube of the mercury switch 44 when the vehicle is making a right hand turn and therefore the response of the control mechanism will be slower or less sensitive. The same is true should the vehicle make a left hand turn. Then the centrifugal force would have to be great enough to move the ball of mercury 59 upwardly and into contact with the electrodes 51 and 52 for electrically connecting them. By this arrangement the operator can make the control device more sensitive or less sensitive by merely changing the angular position of the lever 53 on the base 40.

Before describing the electric circuits that cause the control device to operate it is best to mention at this time that I provide an automatic pressure regulator for each of the air lines 22 and 23 which can be used and will automatically vary the air pressure in either of these two lines, this depending on the speed at which the vehicle is traveling and the sharpness of the curve in the road being negotiated by the vehicle. I make use of two identical air pressure regulators shown diagrammatically at P and P' and place them in the air lines 22 and 23, see FIGURE 5 and near to the valves J and K. A description of the air pressure regulator P will suffice for both and like parts will receive similar reference numerals except that the numbers for the parts in their air pressure regulator P' will be primed.

The air pressure regulator P has a valve rod 76 extending therefrom and a pendulum 73 is shown pivotally mounted at 75 and contacting with the free end of the valve rod. A stop 74 prevents the pendulum 73 from swinging to the right in FIGURE 5 and centrifugal force will swing the pendulum to the left. The amount of swinging of the pendulum 73 to the left depends upon the sharpness of the curve being negotiated by the vehicle and the speed of the vehicle. When the pendulum 73 hangs straight down, the air pressure in the line 22 from the valve J to the regulator P will be higher than the air pressure in the same line 22, from the regulator P to the air compartments 9a in the shock absorbers A that are connected to this line. For normal driving speeds the pendulum will not swing when the vehicle rounds a curve in the road.

At higher speeds of the vehicle when negotiating a right hand curve in the road, the pendulum 73 will swing to the left in FIGURE 5 and move the valve rod 76 to the left and will allow air under a greater pressure to flow through the air line 22 from the pressure regulator P to the left side shock absorbers A. These shock absorbers will be elongated to a greater extent and more quickly. The vehicle body will be banked transversely to a greater degree.

The other automatic pressure regulator P' functions in the same manner and controls the change in air pressure from the regulator P' to the shock absorbers on the right hand side of the vehicle. No further description of this need be given. The control device can operate without the automatic air pressure regulators.

It is best now to set forth the wiring diagram that connects the various parts of the control that are operated electrically. In FIGURE 5, I show a source of current such as the battery M for the vehicle. One terminal of the battery is grounded by a wire 60. Another wire 61 leads from the battery M to the engine ignition switch 62. A wire 63 leads from the ignition switch to an on-off switch 64. A wire 65 leads from the on-off switch 64 to a pressure control switch 66 that is connected to the air pressure reserve tank G and controls the air pressure in the tank. A wire 67 leads from the air pressure control switch 66 to the electric clutch E.

When the air pressure in the reserve tank G drops below a predetermined point, the switch 66 will close and then if the ignition switch 62 and the on-off switch 64 are both closed, an electric current will flow from the battery M to the electric clutch E and will cause the clutch to connect the pulley 24 to the air compressor shaft 26 and then the air compressor F will operate. Air will be forced by the air compressor F through the air line 27 and past the check valve 28 for feeding additional compressed air into the air reserve tank G. When the air pressure in the tank G reaches a predetermined point the air pressure switch 66 will open and will stop the flow of current to the electric clutch E. The clutch will then disconnect the pulley 24 from the compressor shaft and no further air will be delivered to the tank G until the air pressure again drops below a predetermined point in the tank.

It will be seen from FIGURE 5 that another wire 68 leads from the wire 65 and is connected to solenoid coils 34 and 34'. Then the wire 69 leads from the coil 34 to the electrode 46 in the mercury switch 44. The other electrode 45 in the switch 44 is grounded by a wire 70. It will also be seen that a wire 71 leads from the solenoid coil 34' to the electrode 52 in the mercury switch 50. Then a wire 72 leads from the electrode 51 and is grounded.

Assume that the parts of the control mechanism are in the positions shown in FIGURE 5 and the driver of the vehicle to which the four shock absorbers A are attached starts to make a right turn. If the speed of the vehicle is not too great and the turn is not too sharp, the automatic pressure regulator P in the line 22 will not be actuated. The turning of the vehicle to the right will cause the ball of mercury 58 in the mercury switch 44 to move to the left in the switch due to centrifugal force and will electrically connect the electrodes 45 and 46 to each other.

Electric current will therefore flow through the wire 68 to the solenoid coil 34 and from the coil through the wire 69 to the electrically closed electrodes 45 and 46 and then through wire 70 to ground. The solenoid coil 34 will be energized and will attract the spring-biased armature 32 for moving this armature downwardly for opening the outlet end 30a of the air pipe 30. The downward movement of the armature 32 will also cause the armature to close the entrance to the air exhaust pipe 36. Air under the desired pressure will then flow through the pipe 29 from the reservoir G through the pipe 30 and into the three-way control valve J. The air will then continue to flow through the air feed line 22 and will enter the upper air compartment 9a of the left front shock absorber and the air compartment 9b of the right front shock absorber. The air will also continue flowing through the extension 22a to the air compartment 9a of the left rear shock absorber to the air compartment 9b of the right rear shock absorber. If the automatic air pressure regulator valve is used in the air line 22, air under the desired pressure will enter the air compartment 9a of the left hand shock absorbers A, and the air compartment 9b of the right hand shock absorbers.

The shock absorbers on the left hand side of the vehicle will be elongated by the air flowing into the upper compartments 9a. The air in the lower compartments 9b of these same two shock absorbers on the left hand side of the vehicle will escape through the air conduits 21 and 21' and will flow out through the conduit 23 and extension 23'. The line 23 communicates with the three-way air control valve K whose armature 32' has not been actuated and therefore the outlet 30a for the pipe 30 that leads into the valve K will be closed.

The air exhausting through the pipe 23 will therefore enter the header 31' of the valve K and will flow down along the side of the armature 32' and enter the air exhaust pipe 36'. This latter pipe connects with the exhaust pipe 37 which leads to the branch pipe 38 and the screened exhaust 39 that permits the air to escape into the atmosphere.

The shock absorbers on the right hand side of the vehicle will be shortened as to their effective length because air has entered the lower compartment 9b of both and has moved the pistons 9 upwardly. The air in the upper compartments 9a of the shock absorbers on the right hand side of the vehicle will exhaust through the pipes 21 and 21' and thence to the extension 23a and pipe 23 and this air will escape to the atmosphere in the manner already described.

As soon as the shock absorbers on the left hand side of the vehicle are elongated and the shock absorbers on the right hand side of the vehicle are shortened as to length, the vehicle body will be banked or tilted transversely so that the left hand side will be higher than the right hand side. It has already been stated that the vehicle is making a right hand turn and therefore the banking of the vehicle body will change the center of gravity not only of the vehicle body but also of the occupants in the car and the curve will be negotiated much more readily and with no feeling of the occupants in wanting to move to the left in the vehicle.

In case the speed of the car is high or the right hand turn in the road is sharp, the automatic pressure regulator P for the air line 22 will come into play. The pendulum 73 for the automatic pressure regulator P cannot swing to the right because of the stop 74 but it can swing to the left about its pivot 75. The swinging of the pendulum 73 to the left in FIGURE 5 will move the valve rod 76 inwardly and permit a greater quantity of air under a higher pressure to flow through the pipe 22. Therefore the upper air compartments 9a in the two left hand shock absorbers A will be filled with air more quickly and under a higher pressure and the shock absorbers will be elongated more rapidly. Also the greater quantity of air will elongate the left hand shock absorbers to a greater length and the vehicle body will be banked transversely at a greater angle. In this way the greater quantity of air at a greater pressure will be delivered to the pipe 22 because of the swinging of the pendulum 73 to the left in FIGURE 5. The air pressure is built up in direct proportion to the speed of the vehicle and to the sharpness of the curve because the pendulum 73 will be acted upon by centrifugal force.

I have already set forth the reason for inclining the mercury switches 44 and 50 at different angles. If the driver wishes control device to be responsive for all slight curves in the road, then he can swing the lever 53 to bring the axes of the mercury switches more nearly into a horizontal line. If he wants the control device to be less sensitive, he can increase the angle the axes of the mercury switches make with respect to the horizontal. The greater angle of the axes of the mercury switches will require a greater turning moment of the vehicle before the mercury switches will be closed.

I have explained how the shock absorbers on one side of the vehicle are elongated when making a right hand turn and how the shock absorbers on the other side are reduced in length. The shock absorbers will operate in their usual manner other than the fact that they can be increased or descreased in length. It is not necessary to describe how the device will function when the vehicle makes a left hand turn because this will be apparent from the study of the control device shown in FIGURE 5.

The air pressure reserve tank G has an air line fitting 77 and it also has a drain plug 78. The air line fitting permits an air line to be attached to the reservoir G when it is designed initially to build up air pressure in the tank to a certain point.

In pick-up trucks and the like only two shock absorbers need be used rather than four. The operation of the control mechanism for the two shock absorbers will be the same as that for the four. The control system is open to the atmosphere when the valves J and K are in normal position. Any type of hydraulic shock absorber may be used with my air cylinder forming a part thereof.

I claim:

1. The combination with a hydraulic shock absorber including:
    (a) a cylinder filled with liquid;
    (b) a piston having bleed passages therein and being slidable in said cylinder;
    (c) a piston rod secured to said piston and having its free end projecting from one end of said cylinder;
    (d) means for receiving any excess fluid from said cylinder as said piston rod moves into said cylinder and for returning it as the rod is moved out of the cylinder; and
    (e) attaching means at the free end of said rod and at the end of said cylinder disposed opposite to the end from which said rod extends for securing said shock absorber to two relatively moving parts of a vehicle; of
    (f) an air-receiving cylinder having a diameter greater than the diameter of said hydraulic cylinder; said air cylinder having an end slidably receiving said hydraulic cylinder and having its other end secured to said piston rod;
    (g) the end of said hydraulic cylinder received in said air cylinder having an outer diameter equal to the inner diameter of the air cylinder and being slidable in the air cylinder and functioning as a second piston to divide the air cylinder into two compartments; and
    (h) ports at the ends of the air cylinder and communicating with said compartments, whereby air entering one of said compartments will enlarge it and cause movement of said second piston in said air cylinder toward the end of said air cylinder that slidably receives said hydraulic cylinder for increasing the effective length of said hydraulic shock absorber, and air entering the other compartment will cause the said second piston to move toward the opposite end of said air cylinder for decreasing the effective length of said hydraulic shock absorber.

2. The combination as set forth in claim 1: and in which
    (a) an extendable conical corrugated shield for enclosing the portion of said hydraulic cylinder that projects beyond said air cylinder, the larger end of said shield being secured to the end of said air cylinder through which the hydraulic cylinder projects and the smaller end of said shield being secured to the end of said hydraulic cylinder that projects from said air cylinder.

3. In combination:
    (a) a first and second hydraulic shock absorber including;
    (b) a hydraulic cylinder for each shock absorber;
    (c) a piston slidable in each cylinder and having a piston rod that slidably extends through an end of said cylinder;
    (d) an air cylinder for each shock absorber and being larger in diameter than the hydraulic cylinder and having an end that slidably receives said hydraulic cylinder; said air cylinder having an opening for air at each end;
    (e) the end of said hydraulic cylinder received in said air cylinder having an enlarged outer diameter that slidably contacts with the inner surface of said air cylinder and constitutes a second piston that divides said air cylinder into upper and lower compartments;
    (f) the exposed ends of said hydraulic cylinders and the free ends of said piston rods of said first and second shock absorbers being attached to two relatively moving parts of a vehicle; said first shock absorber being mounted on one side of the vehicle and said second shock absorber on the other side;
    (g) automatic control means for delivering air to the air cylinders of both shock absorbers for causing air to enter said upper compartment in said first shock absorber for enlarging the effective length of this shock absorber while simultaneously causing air to enter said lower compartment in said second shock absorber for reducing the effective length of this shock absorber, the air entering the upper or lower compartment depending in which way the vehicle is turning; said means including
    (h) a storage tank for compressed air;
    (i) an air conduit leading from said tank to the upper compartment of said first shock absorber and to the lower compartment of said second shock absorber;
    (j) an electrically controlled valve normally closing said air conduit; and
    (k) a switch mounted on the vehicle and being electrically connected to said valve and to a source of current, said switch being closed by centrifugal force when the moving vehicle makes a turn in the right direction and connecting said valve to said electric current source for causing said valve to open and to permit air under pressure to enter the upper compartment of said first shock absorber for moving said second piston for enlarging the effective length of this shock absorber and to permit air under pressure to enter the lower compartment of said second shock absorber for moving said second piston in this shock absorber for reducing the effective length of said second shock absorber.

4. The combination as set forth in claim 3: and in which
    (a) said switch being a mercury switch arranged at such a position with respect to the vehicle that a moving of the vehicle around a curve in a certain direction will cause the mercury in the switch to move by centrifugal force to close the switch; and
    (b) means for adjusting the angular position of the switch for causing the switch to close at different degrees of centrifugal force; whereby adjustment can be made for closing the switch at a desired vehicle speed in rounding a curve in the right direction.

5. The combination as set forth in claim 3: and in which
    (a) a second air conduit in communication with said tank and leading to the upper compartment of said second shock absorber and to the lower compartment of said first shock absorber;
    (b) a second electrically controlled valve normally closing said second air conduit; and (c) a second switch mounted on the vehicle and being electrically connected to said second valve and to said current source, said second switch being closed by centrifugal force when the moving vehicle makes a turn in the opposite direction from that which will close said first switch, said second switch when closed connecting said second valve to said current source for opening said second valve and permit air under pressure to enter the upper compartment of said second shock absorber for moving its second piston for enlarging the effective length of said second shock absorber; and (d) to permit air under pressure to enter the lower compartment of said first shock absorber for moving its second piston for reducing the effective length of said first shock absorber.

6. The combination as set forth in claim 5: and in which
(a) said second switch being a mercury switch arranged close to said first mercury switch and arranged at such a position with respect to the vehicle that a moving of the vehicle around a curve in an opposite direction to that which will close said first switch, will cause the mercury in said second switch to move by centrifugal force to close said second switch; and
(b) common means for adjusting the angular positions of both mercury switches for causing them to close at different degrees of centrifugal force, only one switch at a time being closed and this depending upon the speed and direction of curve the vehicle is taking.

7. The combination as set forth in claim 6: and in which
(a) a third shock absorber of identical construction to the first two shock absorbers and having the exposed end of its hydraulic cylinder and the free end of its piston rod attached to two relatively moving parts of the vehicle that are on the same vehicle side as said first shock absorber;
(b) the upper compartment of said third shock absorber being in communication with said first mentioned air conduit;
(c) a fourth shock absorber of identical construction to the other three shock absorbers and having the exposed end of its hydraulic cylinder and the free end of its piston rod attached to two relatively moving parts of the vehicle that are on the same vehicle side as said second shock absorber;
(d) the upper compartment of said fourth shock absorber being in communication with said second air conduit and with the lower compartment of said third shock absorber; and
(e) the upper compartment of said third shock absorber being in communication with the lower compartment in said fourth shock absorber;
(f) whereby both the first and third shock absorbers will operate together to be either elongated or shortened as to their effective lengths and the second and fourth shock absorbers will operate together to be either elongated or shortened as to their effective lengths.

8. The combination as set forth in claim 6: and in which
(a) a first automatic air pressure regulating means is placed in said first air conduit and between said tank and first electric valve for normally causing the pressure of the air at said first valve to be less than that at said tank;
(b) said automatic air pressure regulating means being actuated by centrifugal force of the vehicle rounding a curve in the right direction and at a predetermined speed or faster for permitting air under a greater pressure to pass to said first valve and to the upper air compartment in said first shock absorber and to the lower air compartment in said second shock absorber;
(c) whereby said first shock absorber will have its effective length increased more quickly and the increased air pressure will cause the first shock absorber to offer greater resistance;
(d) said second shock absorber will have its effective length decreased more quickly and the increased air pressure will cause said second shock absorber to offer greater resistance;
(e) a second automatic air pressure regulating means is placed in said second air conduit and between said tank and said second electric valve for normally causing the pressure of the air at said second valve to be less than that in said tank;
(f) said second automatic air pressure regulating means being actuated by centrifugal force of the vehicle rounding a curve in the opposite direction to that which will operate said first automatic air pressure valve and at a predetermined speed or faster for permitting air under a greater pressure to pass to said second valve and to the upper air compartment in said second shock absorber and to the lower air compartment in said first shock absorber;
(g) whereby said second shock absorber will have its effective length increased more quickly and said first shock absorber will have its effective length decreased more quickly.

9. The combination as set forth in claim 8: and in which
(a) said first and second valves when not electrically connected to a source of electric current, venting the compartments to which they are connected, to the atmosphere so that the air cylinders will offer no resistance to the normal functioning of the hydraulic shock absorbers.

10. The combination with a hydraulic shock absorber having:
(a) two relatively movable parts adapted to move toward and away from each other;
(b) means interconnecting said parts for resisting and retarding the movement of said parts toward and away from each other; and
(c) attaching means for securing said two relatively movable parts to two relative moving parts of a vehicle; of
(d) an air-receiving cylinder having an air port at each end;
(e) a piston slidable in said air cylinder and dividing it into two air compartments, said piston being operatively connected to one of said relatively movable parts of said hydraulic shock absorber for foreshortening the effective distance between said two hydraulic shock absorber parts when air is admitted to one of said air compartments for enlarging it; and
(f) said air cylinder being operatively connected to the other of said hydraulic shock absorber parts for elongating the effective distance between said two hydraulic shock absorber parts when air is admitted to the other said air compartment for enlarging it.

11. In combination:
(a) a first and second hydraulic shock absorber and including
(b) two relatively movable parts adapted to move toward and away from each other;
(c) means in each shock absorber for interconnecting its two movable parts for resisting and retarding the movement of said parts toward and away from each other;
(d) separate attaching means for each hydraulic shock absorber for securing said two relatively movable parts to two relatively moving parts on each side of a vehicle;
(e) an air-receiving cylinder for each shock absorber and having an air port at each end;
(f) a piston slidably in each air cylinder and dividing it into upper and lower air compartments;
(g) each piston being operatively connected to one of said relatively movable parts of each shock absorber for foreshortening the effective distance between said two shock absorber parts when air is admitted to the lower compartments for enlarging them;

(h) each air cylinder being operatively connected to the other part of its associate shock absorber for elongating the effective distance between the two parts of the associate shock absorber when air is admitted to the lower air compartments for enlarging them; and (i) means for simultaneously admitting air to the lower compartment of one air cylinder and to the upper compartment of the other air cylinder for causing the foreshortening of the shock absorber associated with the first air cylinder and for causing the elongating of the shock absorber associated with the other air cylinder;

(j) whereby the vehicle body will be tilted laterally by the foreshortened shock absorber on one side and the elongated shock absorber on the other side.

12. The combination with a hydraulic shock absorber having:

(a) two elongated and relatively movable parts adapted to be moved relative to each other and in the direction of their lengths for foreshortening the effective length of the shock absorber when the two parts are moved toward each other and for elongating the effective length when the two parts are moved away from each other;

(b) means interconnecting said parts for resisting and retarding the movement of said parts toward and away from each other; and (e) attaching means for securing said two relatively movable parts to two relatively moving parts of a vehicle; of (d) an air-receiving cylinder having an air port at each end;

(e) a piston slidable in said air cylinder and dividing it into two air compartments, said piston being operatively connected to one of said relatively movable parts of said shock absorber for moving it toward the other part for foreshortening the effective length of said shock absorber when air is admitted to one of said air compartments for enlarging it; and (f) said air cylinder being operatively connected to the other of said shock absorber parts for elongating the effective length of the shock absorber by moving the parts away from each other when air is admitted to the other air compartment for enlarging it.

13. The combination with a shock absorber having (a) two relatively movable parts operatively connected together and adapted to be moved in one direction with respect to each other for elongating the effective length of the shock absorber and moved in the opposite direction for shortening the effective length;

(b) means for securing said two relatively movable parts to two relatively moving parts of a vehicle; of (c) a two-way air cylinder connected to one of said absorber movable parts; and (d) a piston slidable in said air cylinder and operatively connected to the other movable part of said shock absorber;

(e) said piston when moved in one direction due to air entering one end of said air cylinders moving the two parts of the shock absorber away from each other for increasing the effective length of said shock absorber and said piston when moved in the other direction due to air entering the other end of said air cylinder, moving the two parts of the shock absorber toward each other for decreasing the effective shock absorber's length.

14. The combination with a shock absorber having
(a) a hydraulic cylinder attached to one movable member of a vehicle; and (b) a piston slidable in said cylinder and having a piston rod attached to another relatively movable member of the same vehicle; of (c) an air cylinder having one end attached to the portion of the piston rod that projects outside of said hydraulic cylinder and having its other end slidable on said hydraulic cylinder and making an air tight connection therewith; and (d) the end of said hydraulic cylinder received in said air cylinder being enlarged and constituting a second piston that is slidable in said air cylinder and dividing the air cylinder into two air-receiving compartments that can vary in capacity as the second piston moves in said air cylinder;

(e) whereby when air is admitted into said air cylinder at one end thereof the second piston is moved for exposing more of said piston rod from said hydraulic cylinder for increasing the effective length of said shock absorber, and when air is admitted into the other end of said air cylinder, the second piston will be moved in the opposite direction for receiving more of the exposed portion of said piston rod for decreasing the effective length of said shock absorber.

15. The combination with a vehicle having relatively movable parts on each side; of (a) a first shock absorber disposed on one side of the vehicle and being connected to the two relatively movable parts on the same side of the vehicle;

(b) a second shock absorber disposed on the other side of the vehicle and being connected to the two relatively movable parts on said other side of the vehicle;

(c) air-controlled means operatively connected to the two shock absorbers on both sides of the vehicle for simultaneously elongating the effective length of said first shock absorber for moving the two relatively movable vehicle parts to which it is connected farther apart, and for shortening the effective length of said second shock absorber for moving the two relatively movable vehicle parts on the opposite vehicle side, closer together;

(d) whereby the vehicle is automatically banked in one direction.

16. The combination as set forth in claim 15: and in which said air-controlled means can be actuated for (a) simultaneously shortening the effective length of said first shock absorber for moving the two relatively movable vehicle parts on the same side of the vehicle, toward each other, and for lengthening the effective length of said second shock absorber for moving the two relatively movable vehicle parts on the opposite vehicle side farther apart;

(b) whereby the vehicle is automatically banked in the other direction.

17. The combination as set forth in claim 16: and in which (a) common centrifugal control means is mounted in the vehicle and is operatively connected to said air-controlled means so that (b) when the vehicle makes a turn in one direction moving, the common centrifugal control means will cause said air-controlled means to elongate the effective length of the shock absorber on the side of the vehicle farthest removed from the center of the turn and will cause the effective length of the shock absorber on the opposite vehicle side to shorten;

(c) whereby the vehicle will be automatically banked laterally so that the side of the vehicle nearest the center of turn will be disposed nearer to the ground than the other vehicle side.

18. The combination as set forth in claim 17; and in which (a) when the vehicle makes a turn in the opposite direction while moving, said common centrifugal control means will cause said air-controlled means to elongate the effective length of the shock absorber on the side of the vehicle farthest removed from the center of turn and will shorten the effective length of the shock absorber on the opposite vehicle side;

(b) whereby the vehicle will be automatically banked laterally in the opposite direction.

No references cited.

ARTHUR L. LA POINT, *Primary Examiner.*

R. M. WOHLFORTH, *Assistant Examiner.*